PEAK-READING TUNING INDICATOR
Filed Nov. 7, 1947
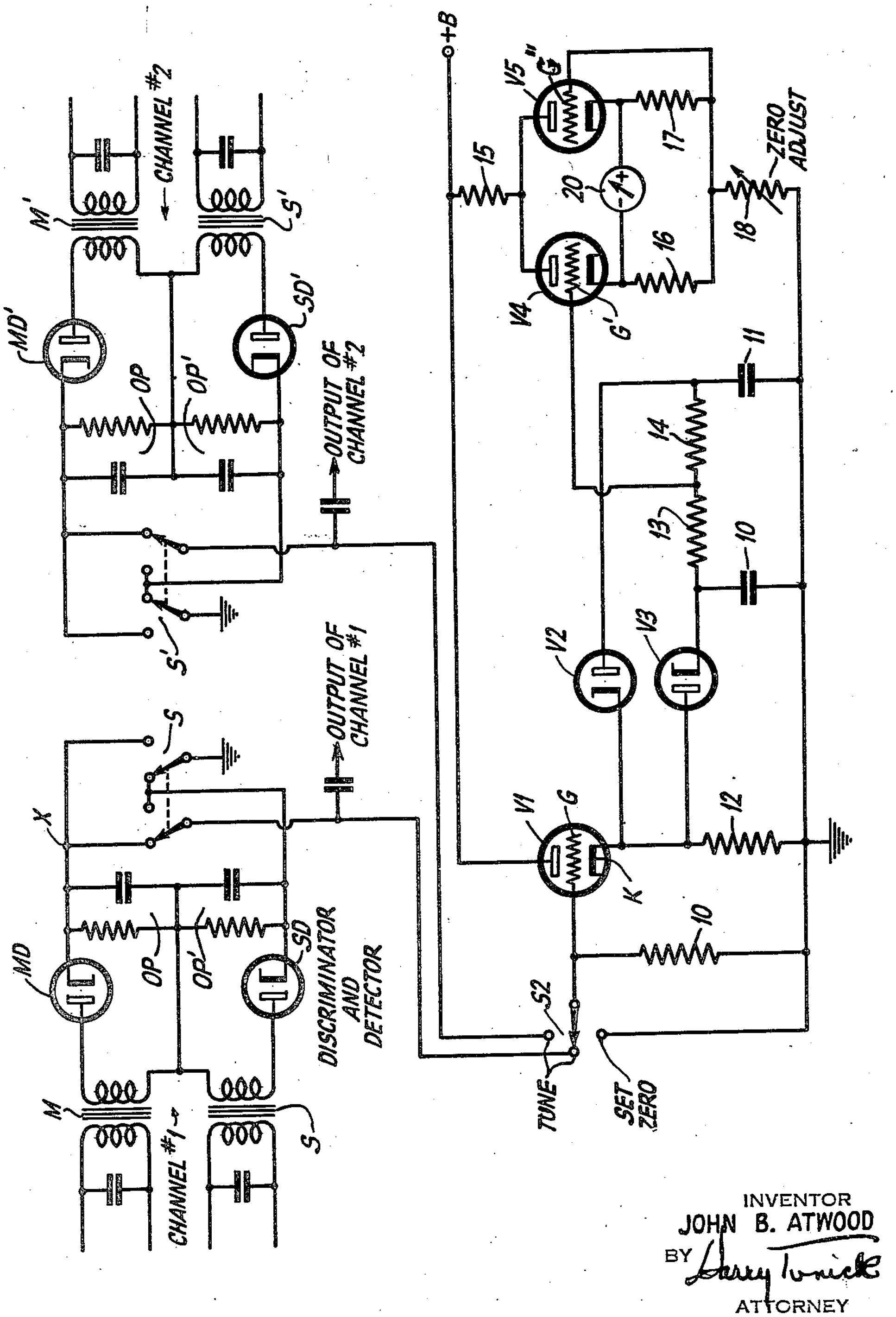
INVENTOR
JOHN B. ATWOOD
BY Harry Tonick
ATTORNEY Patented Oct. 16, 1951 2,571,650

UNITED STATES PATENT OFFICE 2,571,650

PEAK-READING TUNING INDICATOR

John B. Atwood, Riverhead, N. Y., assignor to Radio Corporation of America, a corporation of Delaware Application November 7, 1947, Serial No. 784,744

4 Claims. (Cl. 171—95)

This application discloses an improved tuning indicator for use with frequency shift receivers. A receiver of this type is disclosed in Schock et al. U. S. application Serial #632,978, filed December 5, 1945, which has now ripened into Patent #2,515,668, dated July 18, 1950.

The object of the present invention is to provide improved operation with respect to tuning indicator sensitivity and tuning indicator circuit loading and to insure more nearly a peak indication of the frequency shift keying of the carrier wave.

In describing my invention in detail, reference will be made to the drawing wherein the single figure illustrates by circuit element and circuit element connections a tuning indicator arranged in accordance with my invention.

In frequency shift signalling systems and the like, intelligence is transmitted by shifting the frequency of current between two frequencies, one representing "mark" or the equivalent, the other representing "space" or the equivalent. At the receiver, a frequency discriminator and detector arrangement responds to changes in the frequency of current from one value representing "space" to a second value representing "mark." The detector output voltage or current varies to recreate the signal. The discriminator may be of the Seeley or Conrad type or modifications of either or may comprise a simple tuned circuit the sloping characteristic of which is used to convert frequency changes to amplitude changes which are detected. When the incoming wave frequency is proper with respect to the discriminator characteristic, the detector output varies symmetrically relative to a base value as the carrier frequency is shifted from "mark" to "space" and vice versa. Such a detector then might be as illustrated in the drawings wherein in channel #1 the two off-tuned circuits are labeled M and S respectively and the secondary windings of these tuned circuits are coupled to diodes MD and SD respectively to provide in the circuits OP and OP' and in particular across the resistors thereof, potentials which vary, with respect to a base value, which may be zero potential, as the frequency of the current coming in to channel #1 is varied from "mark" to "space." In a diversity system each receiver includes a discriminator and detector and I have shown the essential features of the discriminator and detector of the #2 channel at the right of the #1 channel described above. There may be other channels in the diversity system. It is obviously desirable to have the wave being detected at the appropriate frequency to insure an output which is symmetrical with respect to a base value, and to do this a tuning indicator of some type is used. Certain of these tuning indicators include diode rectifiers connected in opposed relation, the inputs of which rectifiers are switched to the outputs of the discriminator detectors of the several channels two of which are shown here. These diodes convert the detector output potentials representing "mark" and "space" to D.-C. potential charges in capacitors whose charges are measures of the peak "mark" and "space" frequencies. A resultant potential is derived from the capacitor charges the magnitude of which potential varies slowly if the average frequency of the frequency shifted wave drifts out of the center of the discriminator and this slowly varying potential operates a tube with a zero center scale meter in its plate circuit. The diodes load the detector to which the meter is coupled. Moreover, when switching from one channel to the other takes place, the detector output at the channel to which the meter is switched may be of a different magnitude than the detector output from which the meter is switched. The charges on the condensers in the meter are at that instant inappropriate for the detector output and may effectively short circuit the same until equalization takes place. To reduce this effect, an isolating resistor is used between the meter diodes and the detectors to decouple the same and reduce this loading during switching. Because of this resistor the indications vary with percentage mark on the incoming signal and are then not truly representative of the relation between the frequency of the incoming signal and the tuning of the discriminator circuit.

A purpose of this invention is to provide a tuning indicator which gives a true indication of said relation between "mark" and "space" frequencies and the frequency to which the discriminator is tuned irrespective of the weight or per cent mark on the incoming signal. This is attained in accordance with my invention by use of a cathode follower stage between the diodes and the discriminator detector outputs and by a simplification of the charging circuit for the capacitors.

Tuning meters known heretofore are not sufficiently sensitive for some purposes such as in frequency shifted systems of the type referred to herein and a further purpose of my invention is to provide a tuning meter of increased sensitivity. This is accomplished by providing a bridge type of vacuum tube voltmeter in my novel rectifying and capacitor charging circuit. In the said known arrangement, an excessive amount of current flows through the meter when the receiver is off-tune in one direction. This difficulty is prevented in my improved tuning meter arrangement because of the balanced bridge circuit wherein the meter is included.

The meter circuit comprises a tube V1 having a control grid G coupled to a switch S2 which may be placed in one of three positions, two of which are labeled "Tune" the remainder position being labeled "Set zero." The grid G is connected to ground by resistor 10, which supplies bias and protects tube V1 when switch S2 is open. The cathode K is connected to ground by a resistor 12. The anode is supplied with positive potential. Tube V1 is a cathode follower stage with the cathode load 12 feeding the potential developed therein to opposed diodes V2 and V3 connected to the ends of resistors 14 and 13 respectively and to the upper terminals of capacitors 11 and 10 respectively. A point intermediate the resistors 13 and 14 is coupled to the grid G′ of a tube V4. The tubes V4 and V5 are in a voltmeter circuit including tube V5. The anodes are tied together and connected by resistor 15 to a positive potential source. The cathodes are connected by resistors 16 and 17 respectively and a common variable resistor 18 to ground. The grid of tube V5 is connected to the high potential end of resistor 18. A meter 20 is included in a connection between the cathodes of tubes V4 and V5. The remaining terminals of capacitors 10 and 11 are grounded to complete the charging and discharging paths for capacitors 10 and 11 and the input circuit to the voltmeter tubes V4 and V5.

The meter 20 is a standard 0–1 milliammeter with a special scale. The special scale is not necessary, but it makes for ease of reading by the operator. This scale is so marked that proper tuning is shown when the meter reads center scale when the incoming signal is being keyed. If the receiver is not properly tuned, the meter will indicate to one side or other of the center depending upon the direction of mistuning. Additional marks are provided so that the receiver may be tuned to a frequency shift keying signal which is not being keyed and is left on "mark" or on "space."

Switch S2 is first thrown to the "set zero" position so that there is no input on the grid of tube V1. The voltage developed across resistor 12 then charges up capacitors 10 and 11 through diode V3 and this voltage is applied to the grid of V4. With no input at the grid G of tube V1 a certain voltage appears at the cathode K of V1. If there is no charge on the condensers 10 and 11, the anode of V3 is then positive with respect to its cathode and current flows from the cathode of V1 through the diode V3 and condenser 10 back to resistor 12. Capacitor 11 is likewise charged through resistors 13 and 14. This voltage applied to the grid of tube V4 would cause meter 20 to read off center scale if it were not for the "zero adjust" resistor 18. This resistor 18 raises the bridge circuit VTVM (consisting of tubes V4 and V5, meter 20, and resistors 15, 16, and 17) off ground and changes the bias on tube V4. Resistor 18 is adjusted until the meter reads center scale. Switch S2 is then thrown to the "tone" position, which connects the grid G of V1 to the detector output, say through switch S to the point X.

When the incoming frequency shift keying signal is tuned properly, it is centered on the discriminator and equal positive and negative keying voltages appear on the output of the detector at point X. These are applied to the grid of V1 and as a result, the voltage across resistor 12 increases and decreases with the changes in the grid voltage. Since initially the voltage across the capacitors 10 and 11 is the same as the rest condition voltage across resistor 12, an increase in this voltage will charge capacitor 10 to a selected higher voltage through diode V3 almost instantaneously. Capacitor 11 is not charged materially because the time constant of the resistors 13 and 14 and capacitor 11 is long with respect to the keying rate. A decrease in the voltage at the cathode of V1 which goes below the rest voltage discussed above will discharge capacitor 11 through diode V2. The capacitor 11 has been charged to the rest voltage and is at a potentional higher than the potential on the cathode of tube V1 and this higher potential on the anode of tube V2 causes the same to conduct to partially discharge capacitor 11. The charge in capacitor 10 is not materially changed by this partial discharge of capacitor 11. Capacitor 10 cannot discharge through resistors 13 and 14 and tube V2 because of the long time constant of this network. The cathode of tube V3 is of higher potential than the anode of tube V3 (cathode of tube V1) and capacitor 10 cannot discharge through the tube V3.

When the potential at tube V1 and its cathode swings up capacitor 10 is again brought up to said selected higher charge assuming it has been discharged very slightly while condenser 11 was being discharged. At this time the charge on condenser 11 is not changed appreciably because of the network time constant and because the cathode of tube V2 is at a potential above its anode potential. Under the assumed conditions, capacitor 10 will have its voltage increased by the keying action the same amount that the voltage of capacitor 11 will be decreased. As a result, the voltage appearing at the grid of tube V4 from the center point of the two equal resistors 13 and 14 will be unchanged and the meter 20 will indicate center scale.

If the incoming signal is off-tune in one direction, the keying voltages appearing on the output of the detector at X may both be positive with respect to ground, but one will be more positive than the other. The voltage appearing at the center point of resistors 13 and 14 will then be increased and the meter 20 will then be deflected from its center position.

Similarly, if the incoming signal is off tune in the other direction, the keying voltages appearing on the output of the detector may both be negative with respect to ground, but one will be more negative than the other. The voltage appearing at the center point of resistors 13 and 14 will then be decreased and meter 20 will be deflected in the other direction.

If the incoming signal stops keying on either mark or space, as is required for different types of recording, capacitors 10 and 11 will have their charges equalized at a voltage which corresponds to the said mark or space condition and meter 20 will deflect accordingly. These points are marked on the special meter scale. These points can be marked if the gain ahead of the discriminator is so varied as to maintain a constant keying amplitude out of the detector irrespective of the shift.

The switch S2 can be moved from one position of operation to the other without affecting the accuracy of the meter because of the isolating effect of the cathode follower stage V1 and the elimination of the isolating resistor used heretofore.

What is claimed is:

1. Means for indicating the extent of peak potential variations with respect to a base value including, a vacuum tube voltmeter including a tube having a potential sensitive electrode and a cathode, a pair of capacitors each having one terminal coupled to said cathode, an impedance wherein peak potential variations are set up, a charging path for one capacitor including a diode connecting said capacitor to said impedance, a discharging path for the other capacitor including a diode connecting the other capacitor to said impedance, and means for applying a voltage which represents the mean of the charges on said capacitors to said electrode.

2. Indicating means as recited in claim 1 wherein said impedance is the load resistor in the cathode return circuit of an electron discharge device having a control electrode excited by said peak potentials.

3. Means for producing indications of peak potential variations with respect to a base value comprising a pair of electron discharge devices each having a control grid, a cathode and an anode, impedances connecting the output electrodes of said devices to a source of direct current potential, said impedances including two resistors of like value connecting corresponding output electrodes of said devices in parallel with respect to said source, a current indicator connected between said two corresponding resistors, said impedances also including one resistor in a common connection between the cathodes of the devices and the negative terminal of said source, a biasing connection between the control grid of one device and its cathode including one of said two resistors of like value, a pair of capacitors each connected at one terminal to said one resistor in said common cathode connection, a potential divider connected between the other terminals of said capacitors, a pair of rectifiers connected in opposed relation to the opposite terminals of said potential divider, an impedance wherein said peak potential variations appear coupled to said rectifiers to control the charges on said capacitors in accordance with peak swings, and a connection between the grid of the other device and an intermediate point on said potential divider.

4. Means for producing indications of peak potential variations with respect to a base value comprising a pair of electron discharge devices each having a control grid, a cathode and an anode, impedances connecting the output electrodes of said devices to a source of direct current potential, said impedances including two resistors of like value connecting corresponding output electrodes of said devices in parallel with respect to said source, a current indicator connected between said two corresponding resistors, said impedances also including one resistor in a common connection between the cathodes of the devices and the negative terminal of said source, a biasing connection between the control grid of one device and its cathode including one of said two resistors of like value, a pair of capacitors each connected at one terminal to said one resistor in said common cathode connection, a potential divider connected between the other terminals of said capacitors, a pair of rectifiers connected in opposed relation to the opposite terminals of said potential divider, a cathode follower stage excited by said first mentioned potential variations and having its cathode load coupled to said rectifiers to control the charges on said capacitors in accordance with peak swings of said first mentioned potential, and a connection between the grid of the other device and an intermediate point on said potential divider.

JOHN B. ATWOOD.

REFERENCES CITED

The following references are of record in the file of this patent:

UNITED STATES PATENTS

| Number | Name | Date |
|---|---|---|
| 2,160,712 | Barnhart | May 30, 1939 |
| 2,194,516 | Anderson | Mar. 26, 1940 |
| 2,198,323 | Wagner | Apr. 23, 1940 |
| 2,198,464 | Shepard | Apr. 23, 1940 |
| 2,272,849 | Perkins | Feb. 10, 1942 |
| 2,304,377 | Van Roberts | Dec. 8, 1942 |
| 2,358,391 | Ford | Sept. 19, 1944 |
| 2,417,543 | Chapin | Mar. 18, 1947 |
| 2,419,292 | Shepard | Apr. 22, 1947 |
| 2,440,962 | Livingston | May 4, 1948 |